United States Patent
Lee et al.

(10) Patent No.: US 8,398,092 B2
(45) Date of Patent: Mar. 19, 2013

(54) ACTIVE ROLL CONTROL SYSTEM FOR VEHICLE

(75) Inventors: Un Koo Lee, Seoul (KR); Sung Bae Jang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 217 days.

(21) Appl. No.: 12/958,081

(22) Filed: Dec. 1, 2010

(65) Prior Publication Data
US 2012/0049480 A1 Mar. 1, 2012

(30) Foreign Application Priority Data

Aug. 31, 2010 (KR) .................. 10-2010-0085147

(51) Int. Cl.
*B60G 17/016* (2006.01)

(52) U.S. Cl. .............. 280/5.507; 280/5.511; 280/5.52

(58) Field of Classification Search ............. 280/5.507, 280/5.511, 5.52
See application file for complete search history.

(56) References Cited

U.S. PATENT DOCUMENTS

| | | | | |
|---|---|---|---|---|
| 5,070,284 A | * | 12/1991 | Patil et al. ................. | 318/362 |
| 5,186,486 A | * | 2/1993 | Hynds et al. ........... | 280/124.107 |
| 5,491,633 A | * | 2/1996 | Henry et al. ................. | 701/36 |
| 5,632,183 A | * | 5/1997 | Rixon et al. ................. | 74/512 |
| 7,427,073 B2 | * | 9/2008 | Won .......................... | 280/5.507 |
| 7,621,539 B2 | * | 11/2009 | Choi et al. ................. | 280/5.52 |
| 7,766,344 B2 | * | 8/2010 | Buma ....................... | 280/5.511 |

FOREIGN PATENT DOCUMENTS

| | | |
|---|---|---|
| JP | 2006-082751 A | 3/2006 |
| JP | 2008-265565 A | 11/2008 |
| KR | 1999-019957 A | 3/1999 |
| KR | 2006-057316 A | 5/2006 |
| KR | 2009-061989 A | 6/2009 |

\* cited by examiner

*Primary Examiner* — Ruth Ilan
*Assistant Examiner* — Darlene P Condra
(74) *Attorney, Agent, or Firm* — Morgan, Lewis & Bockius LLP (57) ABSTRACT

A roll control system improves stability in turning by actively controlling roll stiffness in accordance with traveling conditions of a vehicle. The active roll control system for a vehicle suspension includes a stabilizer bar of which the middle straight portion is fixed to a sub-frame by a mount bush and both ends are connected with a lower control arm by a stabilizer link to suppress roll of the vehicle body, in which a roll control mechanism is disposed between a lower end connecting portion of the stabilizer link and the lower control arm to increase roll stiffness by increasing a lever ratio of the stabilizer bar, if needed.

5 Claims, 7 Drawing Sheets

FIG. 1

(Prior Art)

ACTIVE ROLL CONTROL SYSTEM FOR VEHICLE

CROSS-REFERENCE TO RELATED APPLICATION

This application claims priority to and the benefit of Korean Patent Application No. 10-2010-0085147 filed in the Korean Intellectual Property Office on Aug. 31, 2010, the entire contents of which application is incorporated herein for all purposes by this reference.

BACKGROUND OF THE INVENTION

1. Field of the Invention

The present invention relates to an active roll control system for a vehicle. More particularly, the present invention relates to an active roll control system for a vehicle which can actively control roll stiffness in accordance with traveling conditions of the vehicle.

2. Description of the Related Art

Vehicles are equipped with a suspension between the car shaft and the car body to achieve riding comfort and traveling stability by reducing vibration and impact from the road in traveling.

Therefore, the suspension is required to smoothly absorb vibrations, such as bounce, rolling, pitching, and yawing of a car body, which are generated in traveling, in order to ensure riding comfort and traveling stability.

In order to achieve the function described above, the suspension of vehicles includes a spring attenuating impact transmitted from the road, a shock absorber improving riding comfort by controlling the free vibration of the spring, and a stabilizer bar minimizing rolling of the vehicle turning.

The stabilizer bar relating to the present invention is a kind of torsion spring that maintains balance of the car body by suppressing roll motion of the car body in turning or traveling on a rough road.

Figure 1:
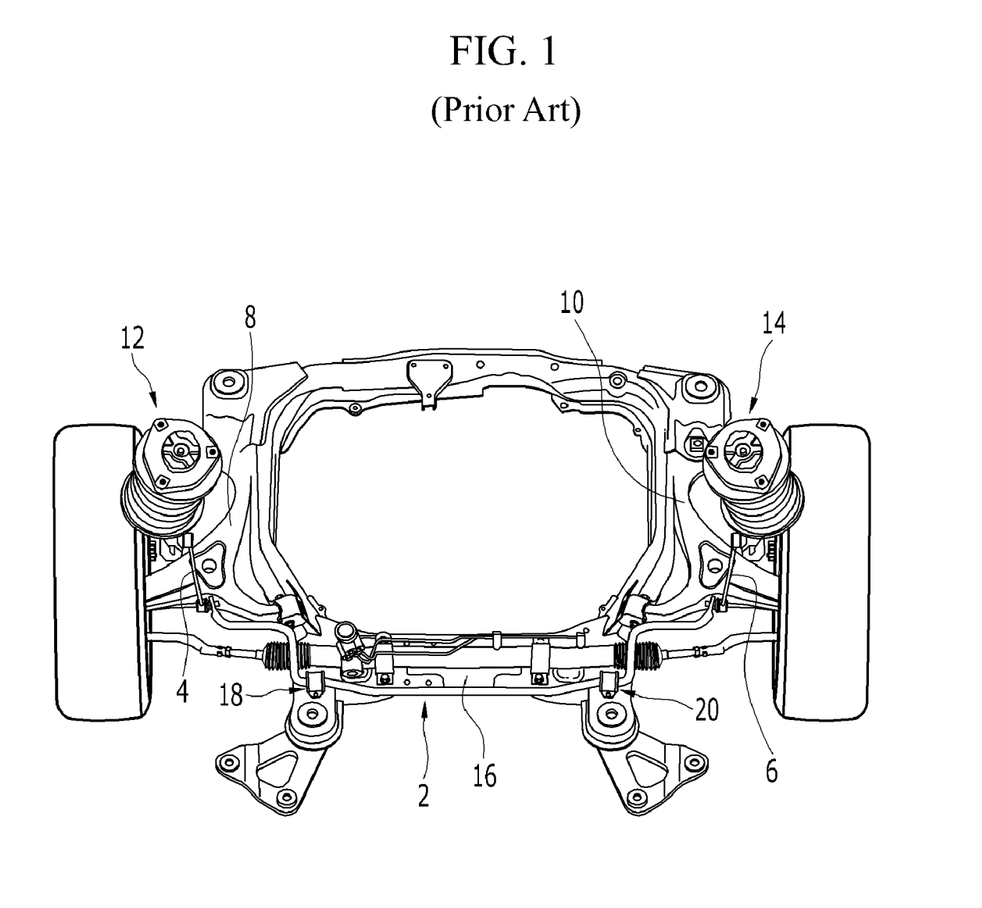
FIG. 1 is a plan view showing an example of a common individual suspension for illustrating applications of the present invention.

In the arrangement of the stabilizer bar, as shown in FIG. 1, lower control rams 8 and 10 or strut assemblies 12 and 14 are connected by disposing stabilizer links 4 and 6 at both ends, and both straight portions are fixed by disposing mount bushes 18 and 20 on a sub-frame 16.

The stabilizer bar 2 described above functions as a sub-spring supporting the left and right wheels in rolling of the vehicle, and suppresses the roll motion of the car body by restricting the left and right wheel with torsional elasticity when the left and right wheels move in the inverse phase, without receiving force when the left and right wheels move in the same phase.

For example, the suspension suppresses inclination of the car body by making both wheels in the same movement when the outer wheels bounce and the inner wheels rebound, in turning, while it does not work when the left and right wheels simultaneously move in the same direction.

However, when a stabilizer is disposed, as described above, the stabilizer bar has small spring characteristics to improve riding comfort, but it is difficult to suppress rolling due to the centrifugal force in turning, while when the spring characteristics of the stabilizer bar is increased, it operates like a fixed axle and reduces the riding comfort.

Further, the stabilizer bar described above has one limited spring characteristic, such that it is impossible to actively control various roll motions generated in turning and it makes the turning unstable, and particularly, it is very unstable in turning at a high speed.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

Various aspects of the present invention have been made in an effort to provide an active roll control system for a vehicle having advantages of having improved turning stability by actively controlling roll stiffness in accordance with traveling conditions of the vehicle.

Various aspects of the present invention provide an active roll control system for a vehicle, in a suspension having a stabilizer bar of which the middle straight portion may be fixed to a sub-frame by a mount bush and both ends are connected with a lower control arm by a stabilizer link to suppress roll of the car body, in which a roll control mechanism may be disposed between a lower end connecting portion of the stabilizer link and the lower control arm to increase roll stiffness by increasing a lever ratio of the stabilizer bar, if needed.

The roll control mechanism may be fixed to the lower control arm to move the lower end connecting portion of the stabilizer link to the wheel in high-speed turning.

The roll control mechanism may include upper and lower cases combined up and down with a space therein and fixed to the lower control arm in the width direction of the vehicle, a slider disposed to be movable left and right in the space, a bracket fixed to the upper portion of the slider and connected with the lower end connecting portion of the stabilizer link, a screw shaft rotatably disposed in the space of the upper and lower cases and combined with the slider in a ball screw type, and an actuator connected to one end of the screw shaft and controlled by an ECU to rotate the screw shaft in the normal and reverse directions, in accordance with traveling conditions of the vehicle.

The space defined by the upper and lower cases and the slider disposed in the space may have polygonal cross-sections corresponding to each other such that the slider moves left and right without rotating.

A rubber bush may be disposed between the bracket and the lower end connecting portion of the stabilizer link to absorb small impact.

The actuator may be an electric motor.

According to the exemplary embodiment of the present invention, the spring characteristic of the stabilizer bar is small in accordance with the initial design and traveling stability is maintained, before the roll control mechanism operates, while the spring characteristic of the stabilizer bar increases and the turning stability is improved, after the roll control mechanism operates in turning at a high speed.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

The drawings are provided to be referred in explaining exemplary embodiments of the present invention and the spirit of the present invention should not be construed in the limit of the accompanying drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive. Like reference numerals designate like elements throughout the specification.

Figure 2:
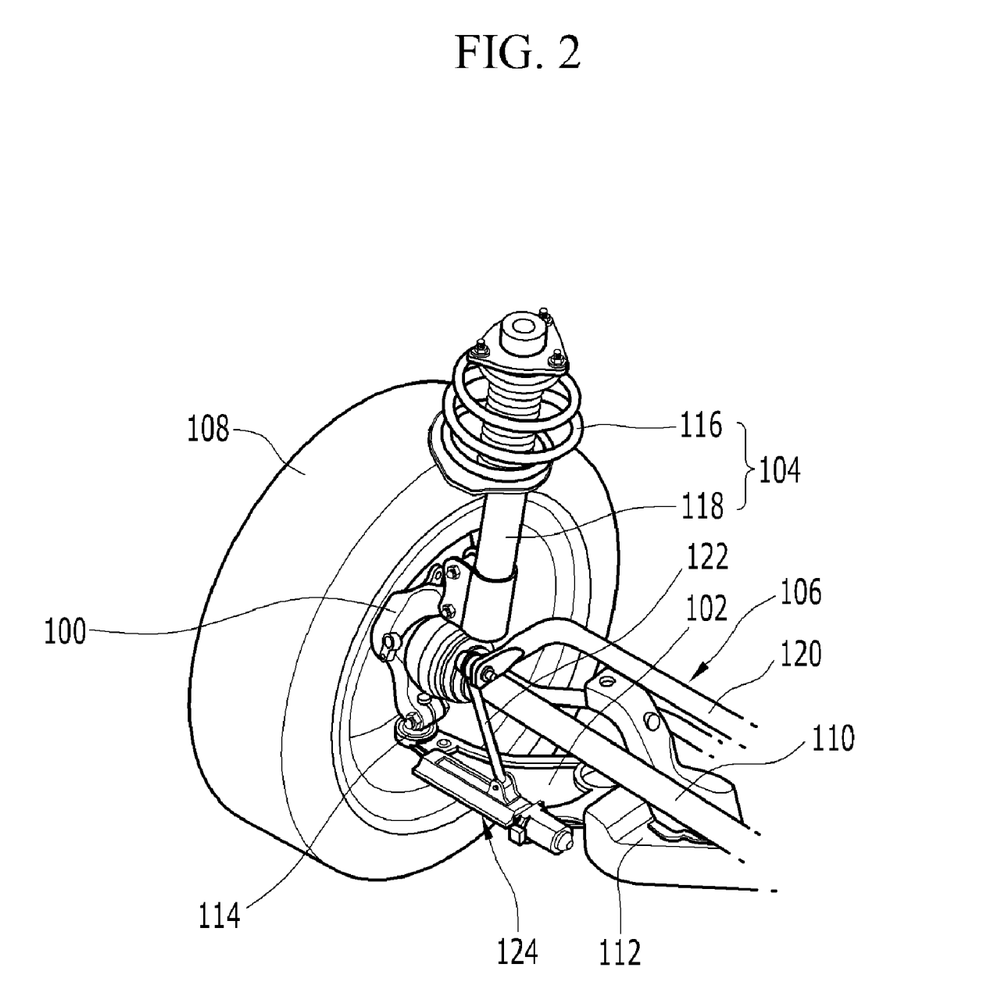
FIG. 2 is a perspective view of an exemplary suspension equipped with a roll control mechanism according to the present invention.

FIG. 2 is a perspective view of an individual suspension equipped with the present invention, which includes a steering knuckle 100, a lower control arm 102, a strut assembly 104, and a stabilizer bar 106.

The steering knuckle 100 supports a wheel 108 rotatably and is connected to the differential of a transmission (not shown) through a drive shaft 110 such that the wheel 108 is driven by torque from the transmission.

The lower control arm 102 is arranged in the width direction of the vehicle to connect the lower portion of the steering knuckle 100 with the car body or a sub-frame 112, and the wheel-sided portion is connected with the steering knuckle 100 by a ball joint 114 and the car body-sided portion is connected with the car body or the sub-frame 112 by a horizontal or vertical rubber bush (not shown).

The strut assembly 104 is composed of a coil spring 116 attenuating impact transmitted from the road and a shock absorber 118 improving riding comfort by controlling free vibration of the coil spring 116, and of which the lower end is fixed to the upper end of the steering knuckle 100 and the upper end is suspended to the car body by a mount insulator.

The stabilizer bar 106 has a straight portion 120 fixed to the sub-frame 112 by a mount bush and both ends connected with the lower control arm 102 by a stabilizer link 122, thereby suppressing rolling of the car body.

The stabilizer link 122 has the lower and upper connecting portions connected to the stabilizer bar 106 and the lower control arm 102 by a rubber bush, and a roll control mechanism 124 is disposed between the lower end of the stabilizer link 122 and the lower control arm 102 in the present invention.

Figure 3:
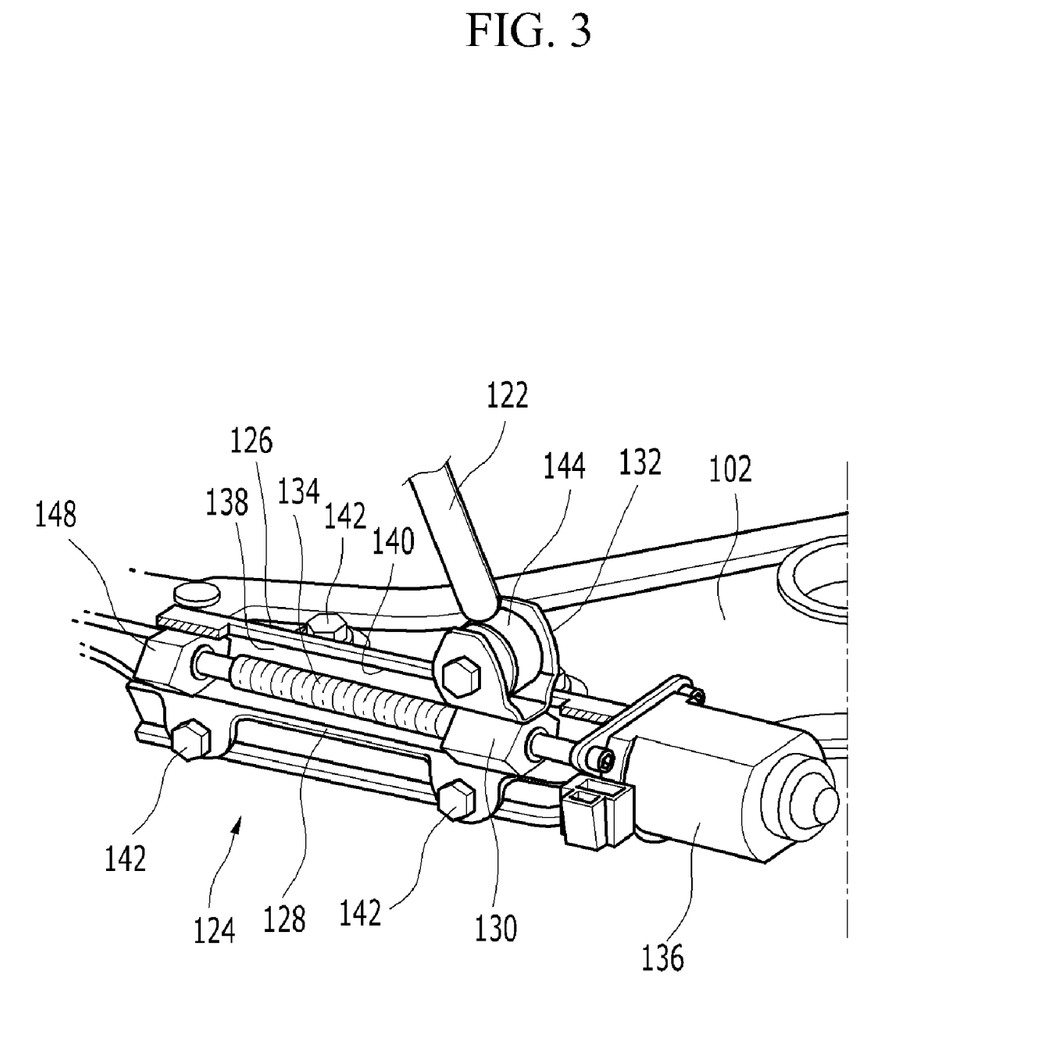
FIG. 3 is a partial cut perspective view of the roll control mechanism of FIG. 2 according to the present invention.
Figure 4:
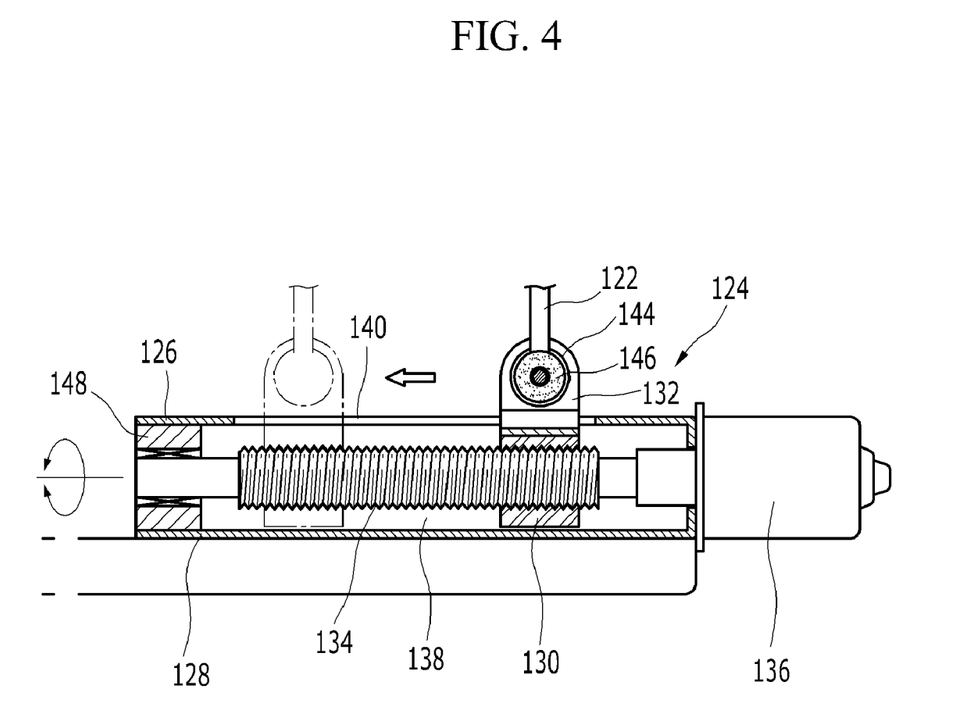
FIG. 4 is a cross-sectional view of the roll control mechanism of FIG. 3.

FIG. 3 and FIG. 4 are a perspective view and a cross-sectional view of the roll control mechanism 124 according to various embodiments of the present invention, where the roll control system 124 includes upper and lower cases 126 and 128, a slider 130, a bracket 132, a screw shaft 134, and an actuator 136.

The upper and lower cases 126 and 128 define a space 138 therein having a length for the slider 130 to be able to move left and right. In various embodiments, the space 138 has a polygonal transverse cross-section, which is substantially a hexagon in the present invention.

Further, a guide hole 140 that guides the bracket 132 moving longitudinally left and right is formed at the center of the upper case 126 and the lower case 128 is fixed at a predetermined position to the lower control arm 102 by a fastener, such as a bolt 142, together with the upper case 126.

The slider 130 can move left and right in the space 138, has a polygonal shape (substantially a hexagon) corresponding to the cross-section of the space 138, and is combined with the screw shaft 134 in a ball screw type to move left and right in the space 138 of the upper and lower case 126 and 128 while moving forward/backward with rotation of the screw shaft 134.

The space 138 in the upper and lower case 126 and 128 and the slider 130 in the space 138 are formed in polygonal shapes so that the slider 130 can only move left and right without rotating, when the screw shaft 134 rotates.

The bracket 132 has a substantially U-shaped cross-sectional and of which the lower end is fixed to the top of the slider 130 and the upper portion is connected with the lower end connecting portion 144 of the stabilizer link 122 by a rubber bush 146.

Therefore, the bracket 132 is integrally formed with the slider 130, as the bracket 132 moves, the slider moves left and right along the guide hole 140, such that the connection position of the stabilizer bar 106 and the control arm 102 changes. In various embodiments, the bracket is affixed to the slider, however, one will appreciate that they may be monolithically formed.

The screw shaft 134 is longitudinally arranged at the center portion in the space 138 of the upper and lower cases 126 and 128 to be rotatably supported by a bearing 148, and the slider 130 is fitted on the screw shaft in the ball screw type.

Therefore, the slider 130 can move left and right by the rotation of the screw shaft 134.

The actuator 136 is a driving motor and connected to one end of the screw shaft 134 to rotate the screw shaft 134 in the normal or reverse direction, if needed, such that the slider 130 is moved left and right.

Figure 5:
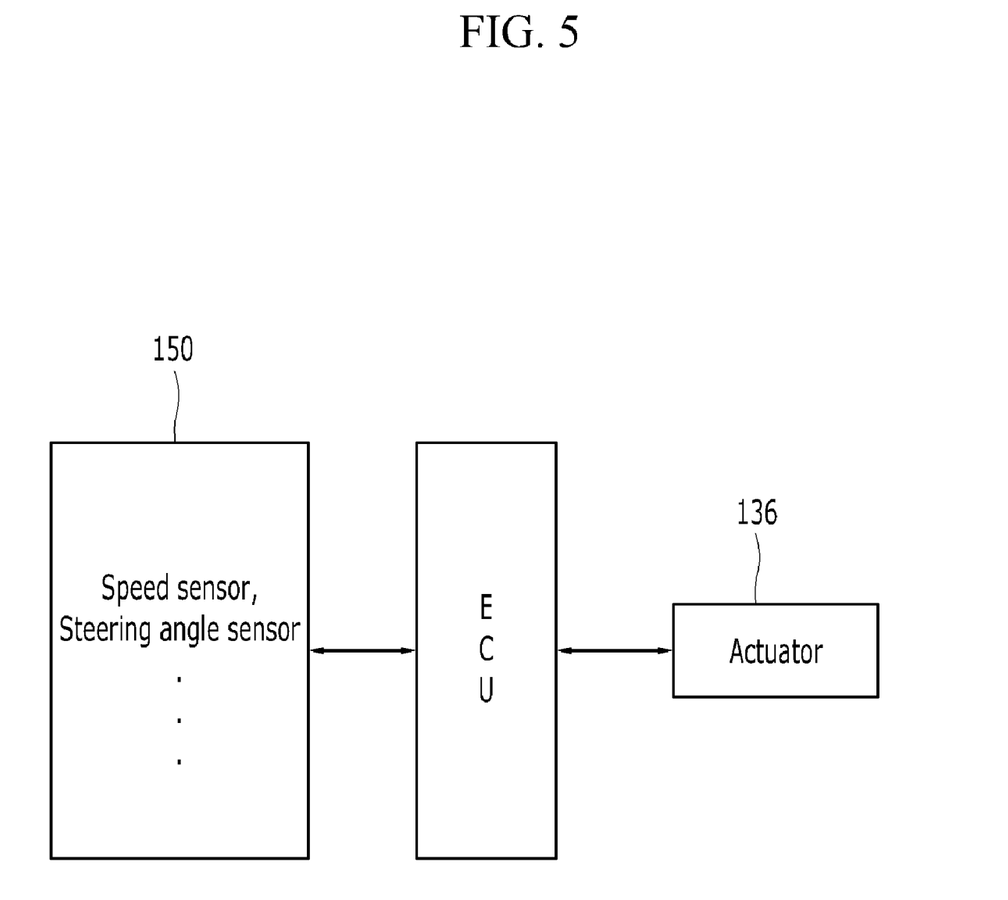
FIG. 5 is a block diagram of an exemplary system for operating the roll control mechanism according to the present invention.

Further, the actuator 136, as shown in FIG. 5, is controlled by an ECU, that is the ECU controls the actuator 136 by comparing signals inputted from a vehicle traveling detector 150 composed of a speed sensor and a steering angle sensor etc.

The ECU may be the control unit of the existing electronic control suspensions.

According to the configuration described above, when the vehicle travels straight or turns at a low speed, the ECU generates no signal, such that the slider 130 is at the initial position G, which is the closest to the car body.

Accordingly, the stabilizer link 122 controls roll motion while maintaining the initial position determined in designing, such that it is possible to achieve stability in straight traveling.

Further, when the vehicle travels and the ECU determines that the vehicle turns at high speed on the basis of the signal inputted to the vehicle traveling detector 150, the ECU controls the actuator 136 to move the slider 130 to the wheel, such that the lower end connecting portion 144 of the stabilizer link 122 is moved to the wheel.

Accordingly, the lever ratio of the stabilizer bar 106 increases and the roll stiffness considerably increases, such that the action force is maintained during the turning and improves stability in turning at high speed.

Figure 6:
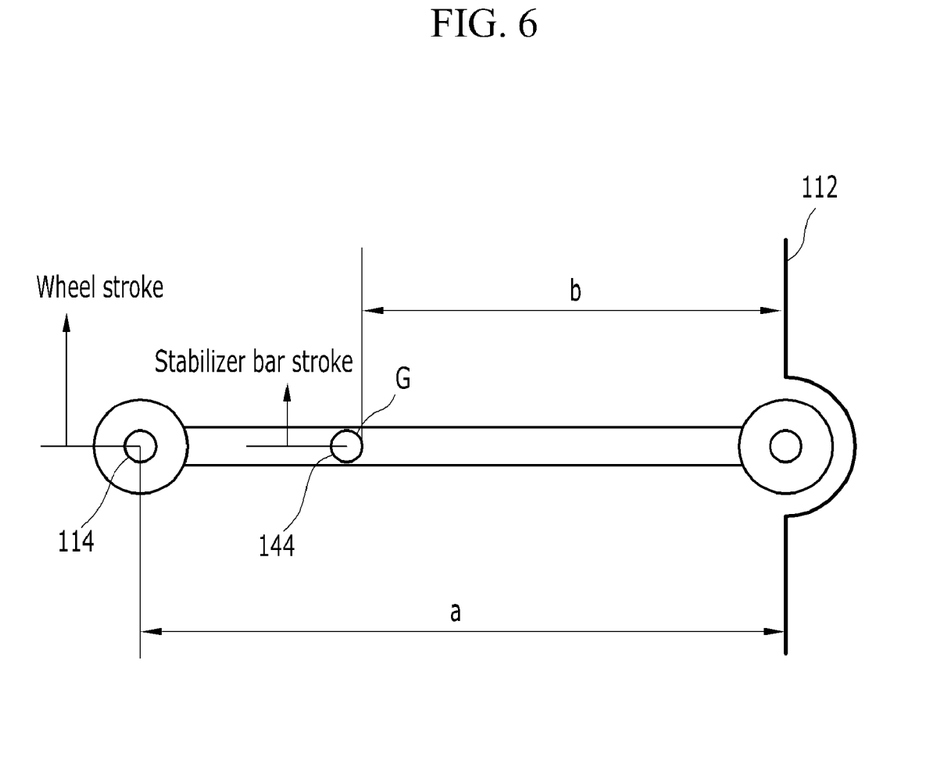
FIG. 6 is a view illustrating an exemplary effect of the present invention, on the basis of a lever ratio.

That is, the increase of the lever ratio means that lever ratio is b/a, as shown in FIG. 6, when the entire length of the lower control arm 102, that is, the wheel stroke is a and the distance from the car body connecting portion to the initial position G of the stabilizer link 122, that is, the stroke of the stabilizer bar is b.

Therefore, as the slider 130 becomes closer to the wheel, the lever ratio (b/a) increases, and the increase of lever ratio (b/a) implies that the spring characteristic of the stabilizer bar 106 increases, and accordingly, stability in high-speed turning is improved.

Further, when the vehicle travels straight again after turning at high speed, as described above, the ECU controls the actuator 136 to moves the slider 130 to the initial position G, such that the roll stiffness returns to the initial level.

Figure 7:
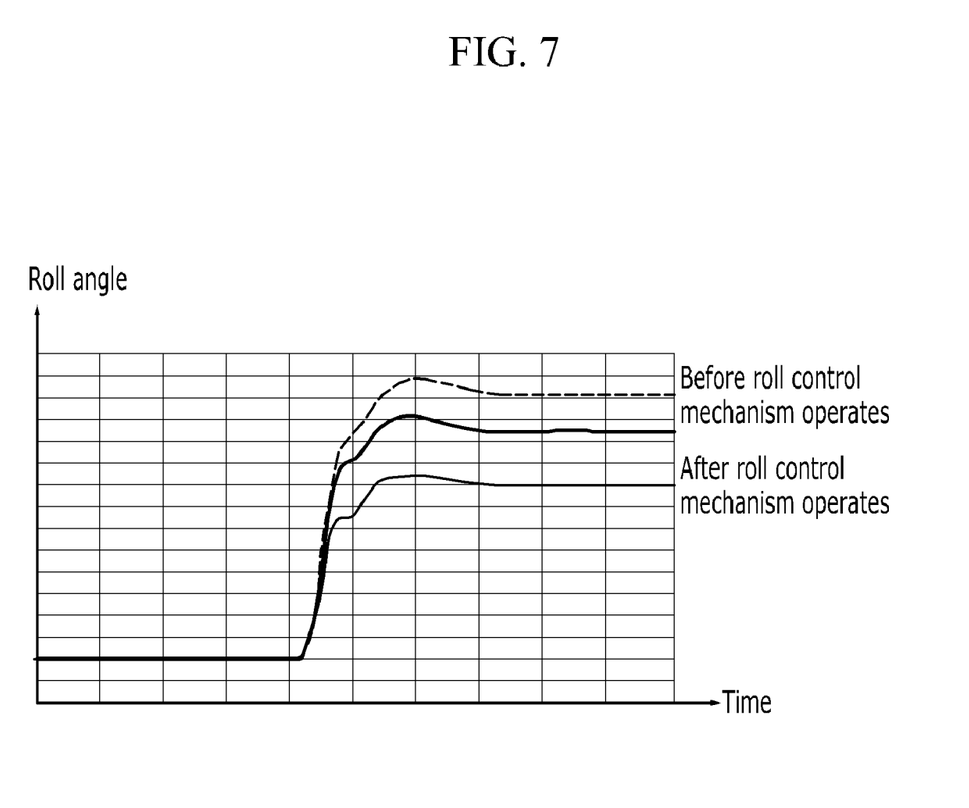
FIG. 7 is a graph illustrating the exemplary effect of the present invention.

That is, as shown in FIG. 7, it can be seen that since the spring characteristic of the stabilizer bar 106 is small in accordance with the initial design, before the roll control mechanism 124 operates, the roll angle increases, while the spring characteristic of the stabilizer bar 106 increases, after the roll control mechanism 124 operates, the roll angle decreases.

Therefore, the present invention improves turning stability by intentionally increasing the spring characteristic of the stabilizer bar 106 in high-speed turning such that the roll stiffness increases and roll of the car body decreases.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active roll control system for a vehicle suspension comprising:
    a suspension sub-frame;
    a lower control arm;
    a stabilizer bar including a middle straight portion fixed to the sub-frame;
    a stabilizer link interconnecting an end of the stabilizer bar to the lower control arm to suppress roll of the vehicle body; and
    wherein a roll control mechanism is disposed between a lower-end connecting portion of the stabilizer link and the lower control arm to increase roll stiffness by adjusting a lever ratio of the stabilizer bar; and
    wherein the roll control mechanism includes:
        upper and lower cases defining a space therebetween and fixed along the lower control arm in a transverse direction of the vehicle;
        a slider disposed within the space and movable left and right in the space;
        a bracket fixed to an upper portion of the slider and connected with the lower-end connecting portion of the stabilizer link;
        a screw shaft rotatably disposed in the space and operably connected with the slider; and
        an actuator connected to one end of the screw shaft and controlled by an ECU to rotate the screw shaft in the normal and reverse directions, in accordance with a traveling condition of the vehicle.

2. The active roll control system of claim 1, wherein:
the roll control mechanism is fixed to the lower control arm and selectively moves the lower-end connecting portion of the stabilizer link toward an adjacent vehicle wheel during high-speed turning.

3. The active roll control system of claim 1, wherein:
the space defined by the upper and lower cases has a polygonal cross-section and the slider has a corresponding polygonal cross-section such that the slider moves within the space without rotating.

4. The active roll control system of claim 1, wherein:
a rubber bush is disposed between the bracket and the lower-end connecting portion of the stabilizer link to absorb small impacts.

5. The active roll control system of claim 1, wherein:
the actuator is an electric motor.

* * * * *